United States Patent [19]
Atago et al.

[11] Patent Number: 6,092,502
[45] Date of Patent: Jul. 25, 2000

[54] DIRECT INJECTION ENGINE CONTROLLER

[75] Inventors: Takeshi Atago; Kousaku Shimada, both of Hitachinaka; Katsuo Saitoh, Atsugi; Shunichi Mitsuishi, Isehara, all of Japan

[73] Assignees: Hitachi, Ltd., Tokyo; Nissan Motor Co., Ltd., Yokohama, both of Japan

[21] Appl. No.: 09/203,605

[22] Filed: Dec. 2, 1998

[30] Foreign Application Priority Data

Feb. 12, 1997 [JP] Japan ................................. 9-331490

[51] Int. Cl.$^7$ ............................................ F02B 31/00
[52] U.S. Cl. .................................................. 123/301
[58] Field of Search .............................. 123/301, 302, 123/306, 308, 295

[56] References Cited

U.S. PATENT DOCUMENTS

| | | | |
|---|---|---|---|
| 4,823,753 | 4/1989 | Murakami et al. ........................ | 123/306 |
| 5,218,937 | 6/1993 | Matsura ................................... | 123/301 |
| 5,609,132 | 3/1997 | Minowa et al. .......................... | 123/306 |
| 5,634,445 | 6/1997 | Nishioka et al. ......................... | 123/306 |
| 5,670,715 | 9/1997 | Tomisawa ................................ | 73/118.1 |
| 5,765,372 | 6/1998 | Mitobe et al. ............................ | 123/585 |
| 5,778,857 | 7/1998 | Nakamura et al. ................. | 123/406.29 |
| 5,875,761 | 3/1999 | Fujieda et al. ............................ | 123/399 |
| 5,909,724 | 6/1999 | Nishimura et al. ...................... | 123/435 |
| 5,927,245 | 7/1999 | Uchida .................................... | 123/301 |
| 5,950,595 | 9/1999 | Yoshioka et al. ........................ | 123/295 |

FOREIGN PATENT DOCUMENTS

| | | | |
|---|---|---|---|
| 7-293260 | of 0000 | Japan . | |
| WO 87/00578 | 1/1987 | WIPO .................................... | 123/295 |

*Primary Examiner*—Erick Solis
*Attorney, Agent, or Firm*—Evenson, McKeown, Edwards & Lenahan, P.L.L.C.

[57] ABSTRACT

A controller of a direct injection engine is basically provided with a swirl control valve arranged in an air intake port portion, a fuel injection valve and a variable fuel pressure regulator, further provided with means for controlling fuel pressure by the variable fuel pressure regulator, means for detecting operational conditions and means for detecting a combustion state, and still further provided with means for controlling a valve opening of the swirl control valve on the basis of the operational conditions and the combustion state.

20 Claims, 15 Drawing Sheets

ENGINE CONDITIONS
Ne = 1400 rpm
Pi = 3.2 kgf / cm$^2$
A / F = 40

ENGINE CONDITIONS
Ne = 1400 rpm
Pi = 3.2 kgf / cm²
A / F = 40

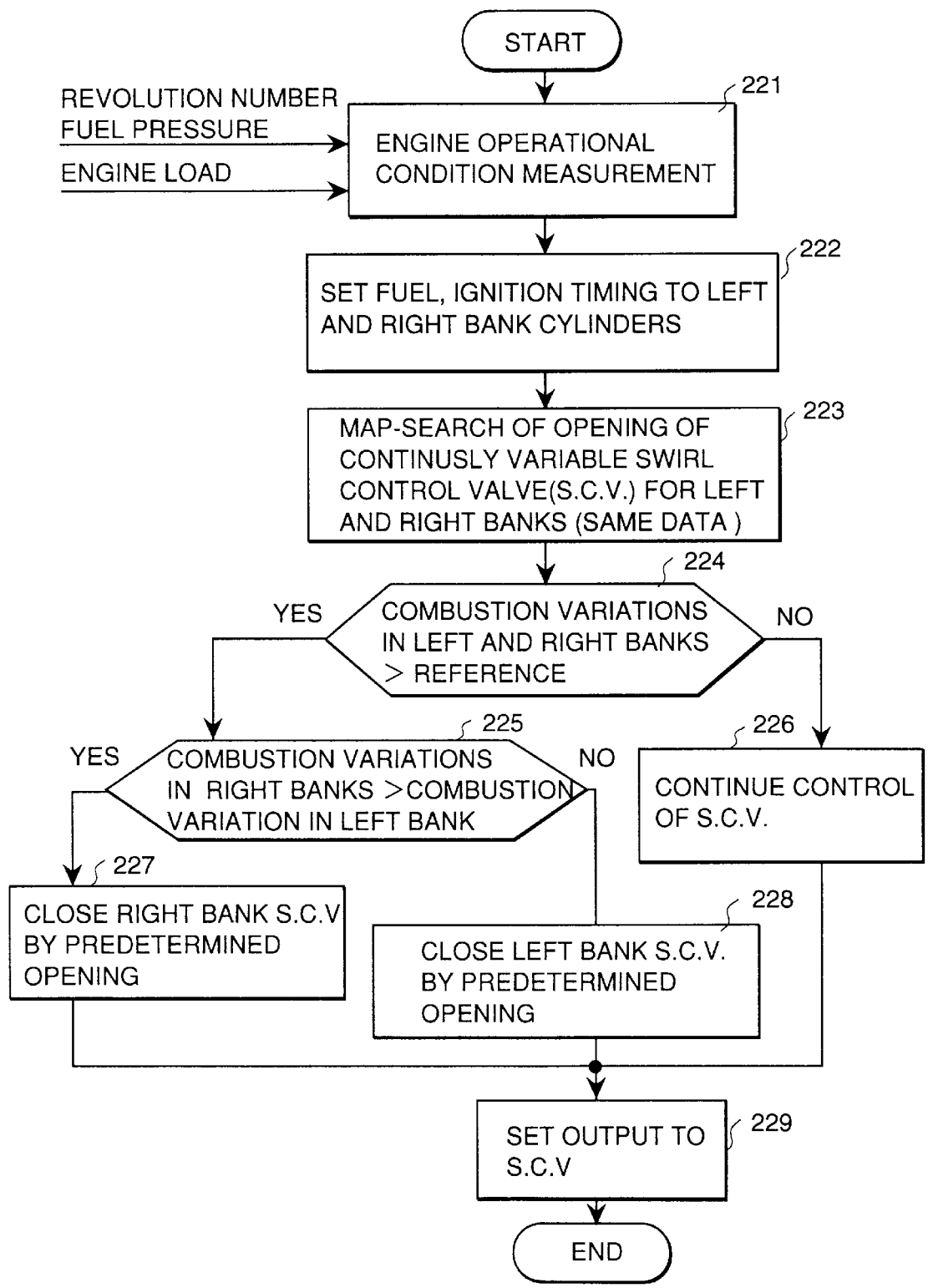

DIRECT INJECTION ENGINE CONTROLLER

BACKGROUND OF THE INVENTION

The present invention relates to a controller of a direct injection engine and, more particularly, to a direct injection engine controller for controlling an opening of a swirl control valve for imparting a swirl to the intake air supplied in the direct injection engine.

Hitherto, for a direct injection engine, it is necessary to effect lean combustion at an air fuel ratio A/F of 40 or more, therefore, gas flow called swirl or tumble is imparted to the air in the combustion chamber of each cylinder. Although there are various means for imparting such gas flow, in general, a suitable gas flow is produced by a combination of a shape of suction pipe and a swirl control valve.

One example of conventional such technique for producing and controlling a swirl using a swirl control valve is disclosed in JP A 7-293260. The technique disclosed in JP A 7-293260, in a fuel injection type engine in which a combustion type (combustion state) is switched to stratified combustion or homogeneous combustion by controlling a fuel injection valve on the basis of operational conditions of the engine, is to improve the combustion condition by controlling the swirl control valve according to the above-mentioned switching of the combustion types to change a producing state of the swirl. Concretely, one of the above-mentioned stratified combustion and homogeneous combustion is selected by controlling so as to change an injection state of the fuel injection valve on the basis of the number of revolutions of an engine and an engine load, and when the stratified combustion and the homogeneous combustion except for an opening position near to a full opening of a throttle valve are selected, the swirl control valve is controlled to close, and when the homogeneous combustion at the opening position near to a full opening of the throttle valve is selected, the swirl control valve is controlled to open.

SUMMARY OF THE INVENTION

In general, the speed of a swirl supplied in the engine combustion chamber becomes naturally large because a quantity of air increases as the engine runs into high speed and high torque, so that an opening of the swirl control valve is necessary to be controlled to be smaller as running speed and torque of the engine becomes higher. However, an opening of the swirl control valve is necessary to be controlled taking into consideration operational conditions and a combustion state of the engine other than the above-mentioned items.

That is, according to a research by the present inventors, the stability of combustion in an engine, occurrence of smoke, occurrence of hydrocarbons, etc. depend on fuel injection timing of a fuel injection valve and ignition timing of an ignition means, as mentioned later, and it is found that for combustion control of the engine it is necessary to take into consideration the above-mentioned fuel injection timing of the fuel injection valve and ignition timing of the ignition means, particularly, the stability of combustion and occurrence of hydrocarbons, etc. are affected by the above-mentioned swirl speed and the best region for the stability of combustion and a minimum region of the occurrence of hydrocarbons exist by selecting a suitable swirl speed. Further, it is also found that the above-mentioned stability of combustion and occurrence of hydrocarbons, etc. are also affected by the pressure of fuel injected from the fuel injection valve. Therefore, when the above-mentioned swirl control valve is controlled to open or close in order to adjust swirl, it is necessary to consider about a combustion state such as the stability of combustion, etc. and the fuel pressure.

Further, in a case where actuators and a control system of the engine are abnormal, it is necessary to hold an opening of the swirl control valve open.

In the above-mentioned conventional technique, production of a swirl and change of the swirl are controlled approximately corresponding to stratified combustion and homogeneous combustion in the engine by controlling to open or close the swirl control valve by making the control to follow after controlling to change an injection state of the fuel injection valve. However, the technique does not control to open or close the swirl control valve directly corresponding to engine operational conditions such as the number of revolutions of engine, an engine output and so on, and it does not consider a combustion state such as the stability of combustion in the engine, the pressure of fuel injected from the fuel injection valve or abnormality in the actuators and the control system of the engine. Therefore, the technique could not precisely control suitable swirl based on a combustion state and operational conditions in the engine.

The present invention is made in view of the above-mentioned problems, and an object of the invention is to provide a controller which is able to precisely control an opening of a swirl control valve which is a factor influencing on combustion to effect stable combustion in a direct injection engine under combustion condition including a super lean air fuel ratio.

In order to achieve the above object, a controller of a direct injection engine according to the present invention is characterized in that the controller is basically provided with a swirl control valve arranged in an air intake port portion, a fuel injection valve and a variable fuel pressure regulator, further provided with means for controlling fuel pressure by the variable fuel pressure regulator, means for detecting operational conditions and means for detecting a combustion state, and still further provided with means for controlling a valve opening of the swirl control valve on the basis of the operational conditions and the combustion state.

A preferable concrete aspect of the direct injection engine controller according to the present invention is characterized in that a basic opening position of the above-mentioned swirl control valve is controlled on the basis of the number of revolutions of engine and a target torque of the above-mentioned operational conditions, and the opening position of the swirl control valve is controlled on the basis of an air fuel ratio set as a target of the engine to a different valve opening position set for each combustion state (homogeneous combustion, stratified combustion, etc.).

Further, it is characterized in that a valve opening position of the swirl control valve is controlled to correct on the basis of an operation fuel pressure of a fuel injection valve, or controlled to correct so as to be stable in engine combustion by a factor indicative of the stability of combustion in the engine.

Further, it is characterized in that a valve opening position of the swirl control valve is controlled to correct so as to open not to reduce engine power when actuators and/or the control system of the engine is abnormal, and when the valve opening position is controlled to open, the valve opening position is restricted so that an increment rate of engine power per time does not become more than a predetermined value.

The direct injection engine controller constructed as mentioned above of the present invention, in order to produce a burnable air fuel mixture in the vicinity of an ignition plug, directly relating to combustion in the engine, controls an opening of the above-mentioned swirl control valve by a parameter based on operational conditions and a combustion state influencing on the combustion in the engine, utilizing that even at the same air fuel ratio supplied in the engine, a reaching state of burnable sprayed fuel is influenced by an opening of the swirl control valve and the pressure of fuel.

Thereby, control of an opening of the swirl control valve, which is inherently designed for the direct injection engine, can be effected without hindering the whole engine control, and a swirl suited for optimum combustion in the engine can be produced by controlling to correct an opening of the swirl control valve, taking into consideration a combustion state of the engine and the pressure of fuel.

Therefore, a direct injection engine needs components such as a fuel injection valve for injecting fuel into the cylinder, an ignition device, a swirl control valve generating gas fluidity in the cylinder of the engine and so on and needs to control the components. The present invention can suitably and precisely control an air fuel ratio, injection timing and ignition timing, and gas fluidity by controlling the above-mentioned components as mentioned above.

BRIEF DESCRIPTION OF THE DRAWINGS

FIG. 22 is a flowchart showing a control flow (V) of the direct injection engine (swirl control valve) in FIG. 1.

DESCRIPTION OF EMBODIMENTS OF THE INVENTION

Figure 1:
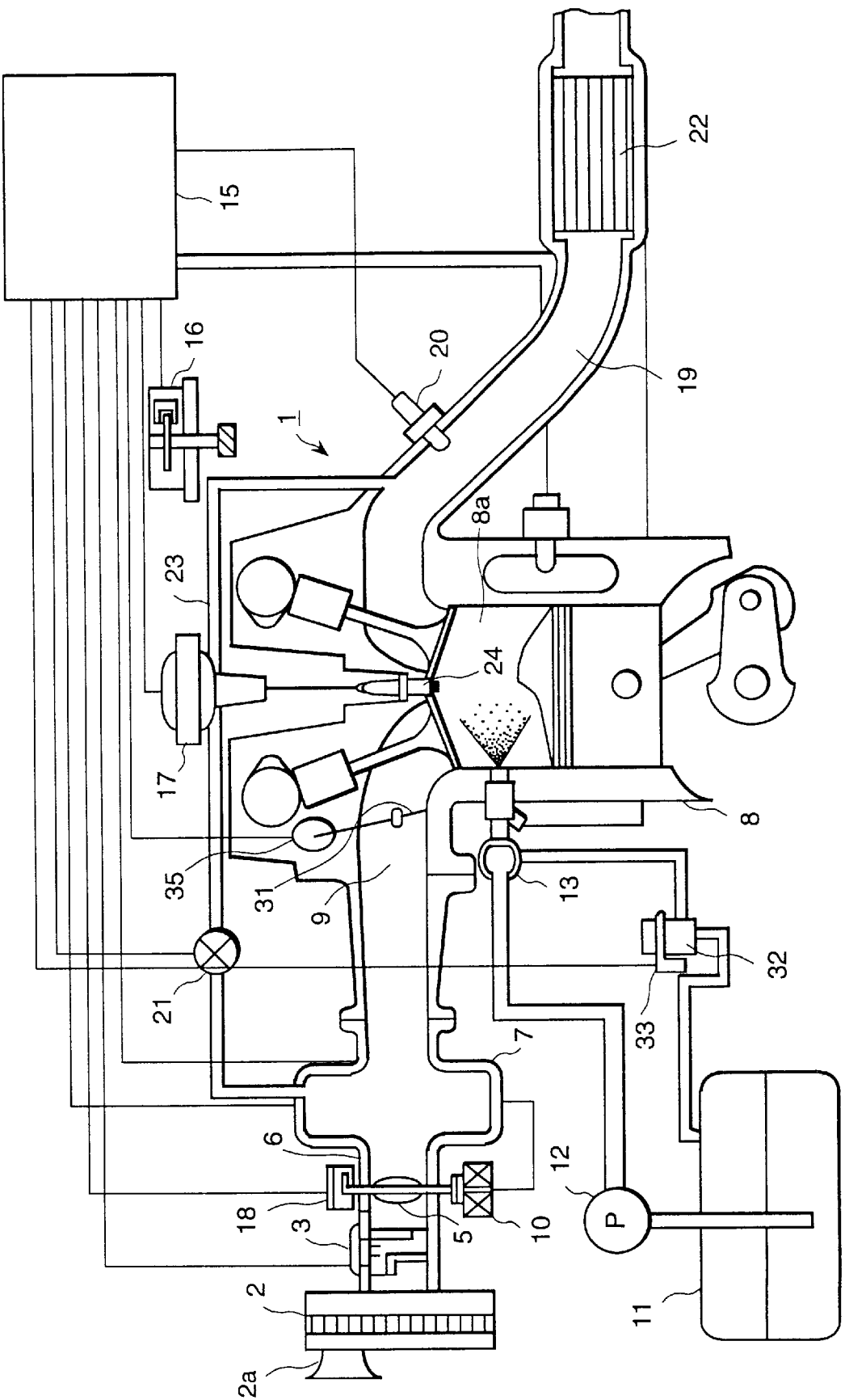
FIG. 1 is a schematic diagram of a whole construction of a control system of a direct injection engine of an embodiment of the present invention.

An embodiment of a controller of a direct injection engine according to the present invention will be described hereunder in detail, referring to the drawings.

FIG. 1 shows the whole construction of a control system of an engine 1 of the present embodiment. In FIG. 1, air sucked in the engine 1 is taken in at an inlet portion 2a of an air cleaner 2, flows at an intake air meter 3 and in a throttle body 6 in which a throttle valve 5 is arranged for controlling an intake air flow rate, and then enters a collector 7. Here, the throttle valve 6 is connected to a motor for driving the valve 6, and constructed so as to be driven by the motor 10 to control an intake air flow rate.

The intake air which reached to the collector 7 is distributed into intake pipes 9 which are connected to cylinders of the engine 1, respectively, and then introduced into a combustion chamber 8a of each cylinder 8. Each of the intake pipes 9 is provided with a continuously variable swirl control valve 31 which is electrically controllable of an intake air opening for the cylinder 8 and a motor actuator 35 adjusting an opening of the variable swirl control valve 31. By adjusting the variable swirl control valve 31, deflection force is imparted to the intake air flowing here. The air to which the deflection force is imparted becomes a swirl of a speed corresponding to the deflection force, and is mixed with fuel splay, as described later, inside the combustion chamber 8a of the cylinder 8. The swirl influences greatly a combustion state.

On the other hand, fuel such as gasoline is sucked from a fuel tank 11 by a fuel pump 12 and pressurized by the pump 12 and then supplied to a fuel injection valve 13 and a fuel system having a variable fuel pressure regulator 32 arranged by piping for controlling the fuel pressure to be in a predetermined range. The fuel pressure is measured by a fuel pressure sensor 33. The above-mentioned fuel is injected, into the combustion chamber 8a, from the fuel injection valve 13 which has an opening opened to the combustion chamber 8a of each cylinder 8.

The air flowed in the combustion chamber 8a and injected fuel are mixed and ignited by an ignition plug 24 to which electric voltage is applied from an ignition coil 17, thereby to be burnt.

Exhaust gas produced through combustion in the combustion chamber 8a of the engine 1 is introduced into an exhaust pipe 19 and discharged out of the engine 1 through a catalyzer 22. A part of the exhaust gas in the exhaust pipe 19 is recirculated into the collector 7 through a pipe 23. On the way of the pipe 23, an electrically controlled EGR valve 21 is mounted for controlling a quantity of recirculation of exhaust gas. The electrically controlled EGR valve 21 is constructed so that an opening area thereof is electrically controlled on the basis of a pressure difference between the upstream and downstream sides of the valve 21 and an air fuel ratio of the exhaust gas, and determines an EGR quantity by the opening area being controlled.

The above-mentioned air flow meter 3 outputs a signal indicative of a quantity of air taken in, and the signal is input into a control unit 15. The above-mentioned throttle body 6 has a throttle sensor 18 mounted thereon for sensing an opening of the throttle valve 5, and the throttle sensor 18 is made so that an output thereof is input into the control unit 15.

A crankangle sensor 16 is driven by a cam shaft (not shown) to rotate and outputs signals indicative of revolutional positions of the crankshaft at a precision of about 2–4°. The signals are input into the control unit 15. According to each of the above-mentioned signals, fuel injection timing, ignition timing, an opening of the swirl control valve 31, etc. each are controlled.

An A/F sensor 20 mounted on the exhaust pipe 19 detects air fuel ratios in a real operation from compositions of the exhaust gas and out puts signals thereof, and the signals are also input into the control unit 15. Although detailed explanation thereof is omitted, the characteristic of A/F has a proportional relation with output voltage.

Further, the control unit 15 inputs signals from various kinds of sensors, etc. which detect operational conditions of the engine 1, executes predetermined processing, produces various control signals as the result of the processing, and outputs the control signals to the fuel injection valve 13, the ignition coil 17, the throttle valve operation motor 10, the electrically controlled EGR valve 21, etc. to effect fuel supply control, ignition timing control, intake air flow control, exhaust gas regulation countermeasure control, etc.

Further, in the control unit 15, a variation in the number of revolutions of the engine is calculated by processing signals of the crankangle sensor 16, and the variation has a very deep correlation with the stability (CPi) of combustion in the engine 1.

Figure 2:
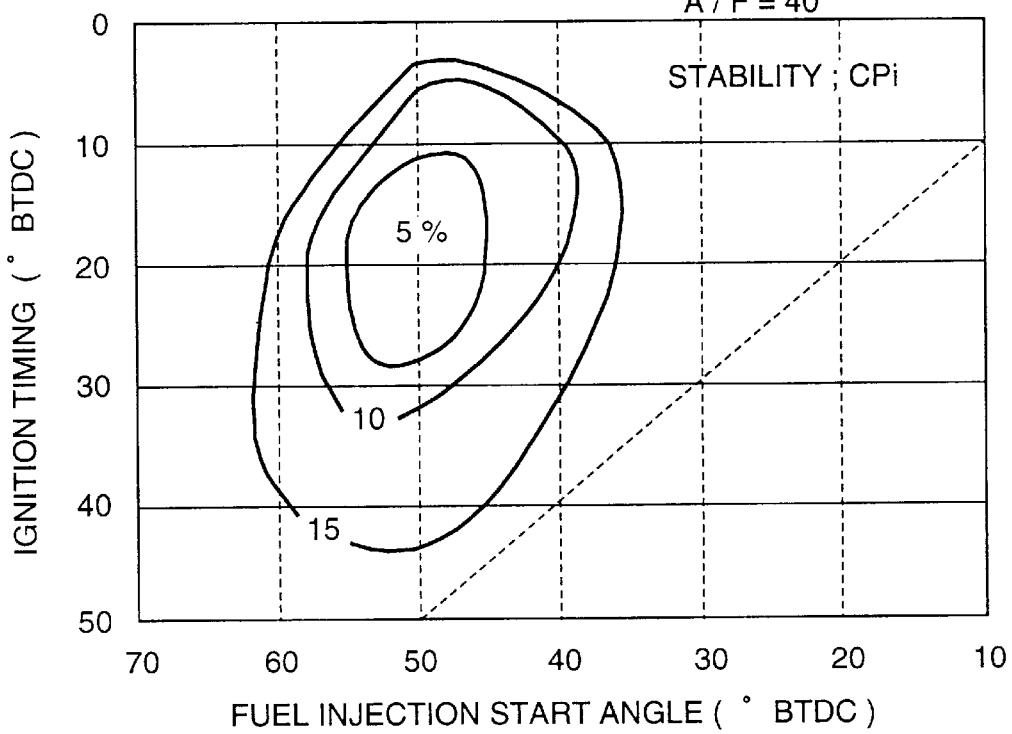
FIG. 2 is a diagram showing characteristics of the stability of combustion in the direct injection engine in FIG. 1.
Figure 3:
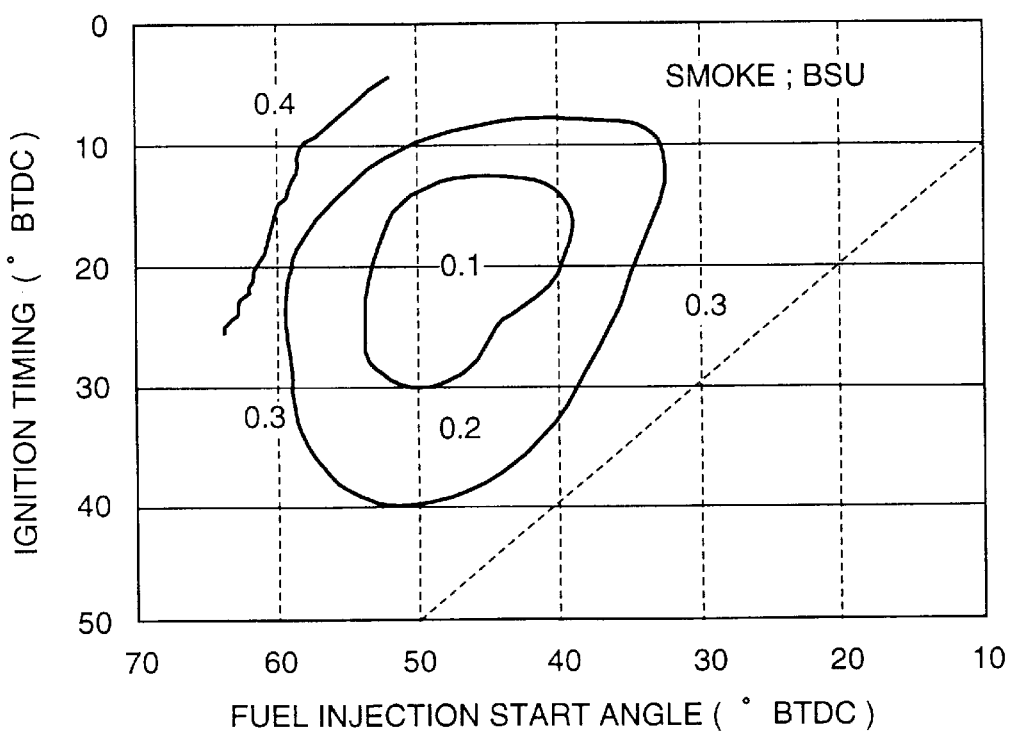
FIG. 3 is a diagram showing characteristics of smoke occurrence in the direct injection engine in FIG. 1.

In such a direct injection engine 1, when an air fuel ratio of a mixture gas to be burnt is set to be leaner than a stoichiometric ratio, characteristics as shown in FIGS. 2 and 3 are obtained. The experimental data are obtained under the conditions that the engine run under a lean condition at an air fuel ratio of 40 while keeping a torque and the number of revolutions each constant. FIG. 2 shows "the stability of engine among engine performance in stratified combustion" from which it is noted that "CPi" indicating the stability of combustion in the engine changes by changing fuel injection timing and ignition timing (the stability is better at a position of lower percentage %). FIG. 3 shows data of smoke which also have a best point (frequencies of smoke occurrence are less at smaller numeral values).

Figure 4:
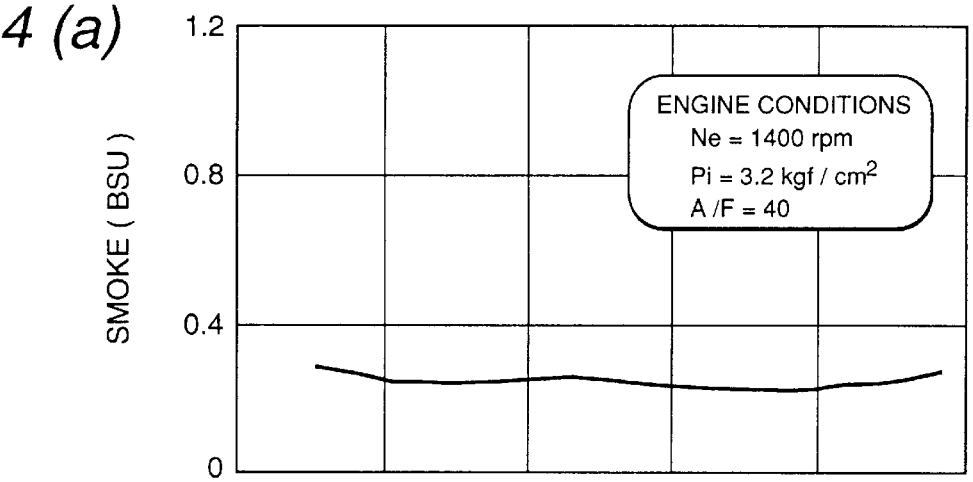
FIGS. 4(a), 4(b) and 4(c) are diagrams showing characteristics of smoke occurrence, HC and the stability of combustion to the speed of swirl in the direct injection engine in FIG. 1, respectively.
Figure 4:
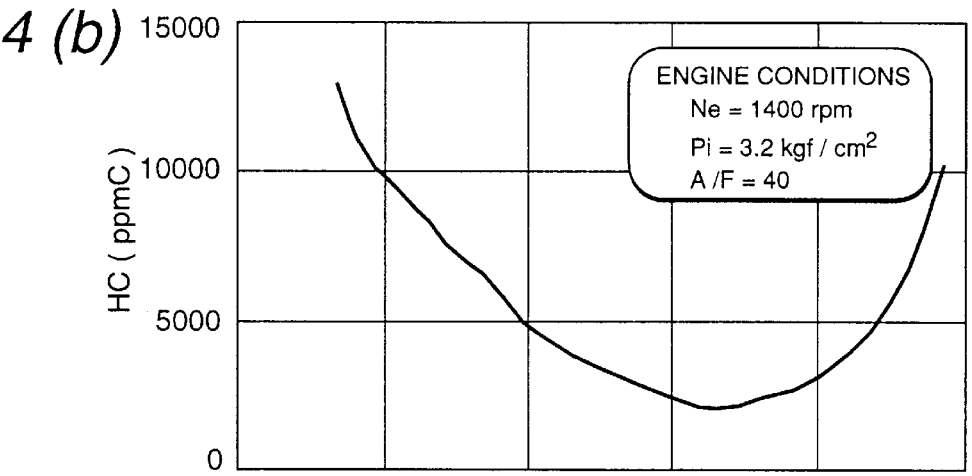
Figure 4:
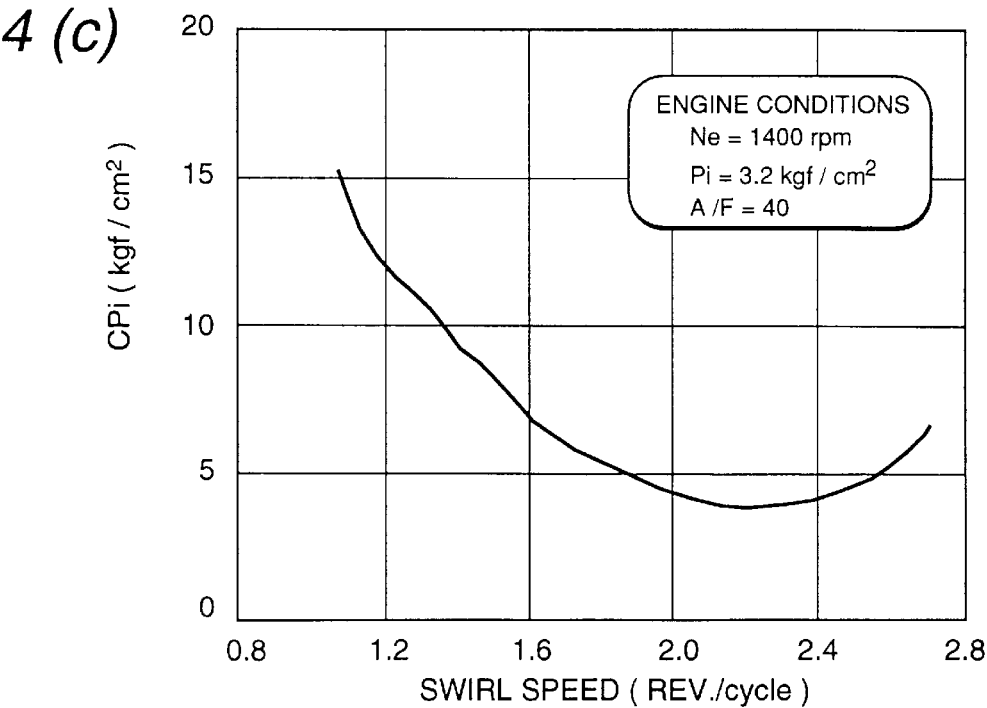

Although FIGS. 2 and 3 each show results at the air fuel ratio of 40, FIGS. 4(a) to 4(c) each show condition on data in a case where "the speed of swirl" indicative of whirling force of air in the cylinder 8 of the engine 1 is changed at the above-mentioned best point. FIGS. 4(a) to 4(c) show engine smoke, hydrocarbons HC and the stability of combustion (CPi) in the engine, which are typical characteristics representative of stratified combustion performance, respectively. Exhaust of HC in FIG. 4(b) and the stability of combustion in FIG. 4(c) are influenced by the speed of swirl, and they each have an optimum value. Further, it is noted that the stability of combustion in the engine as shown in FIG. 4(c) can be controlled by changing the speed of swirl=an opening of the swirl control valve, as described later.

Figure 5:
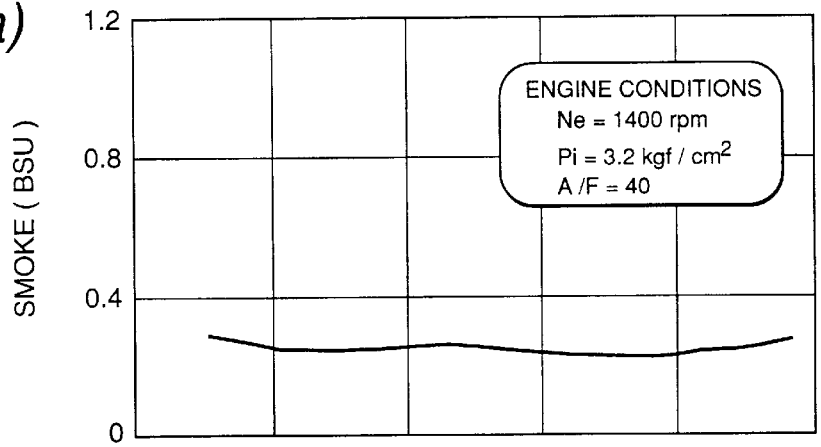
FIGS. 5(a), 5(b) and 5(c) are diagrams showing characteristics of smoke occurrence, HC and the stability of combustion to the pressure of fuel in the direct injection engine in FIG. 1, respectively.
Figure 5:
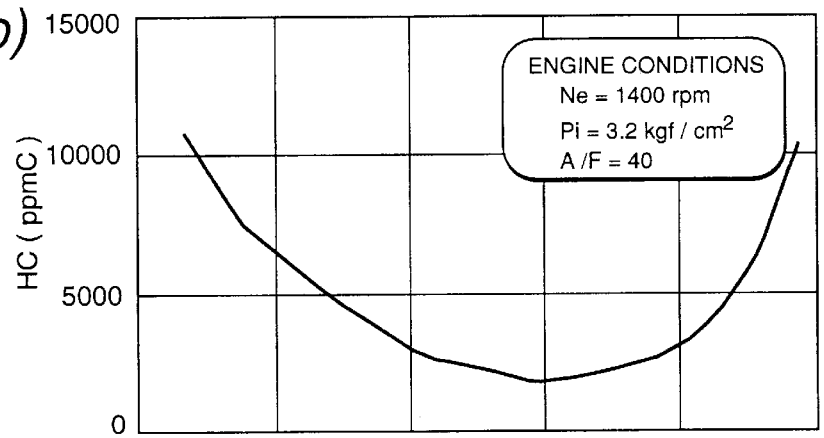
Figure 5:
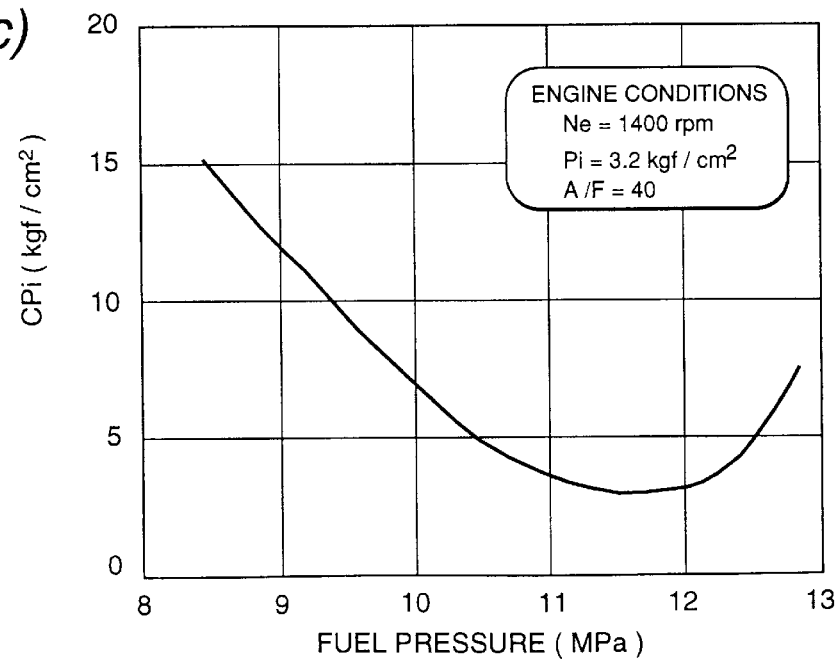

Next, FIGS. 5(a) to 5(c) show relations between fuel pressure of the injector for injecting and supplying fuel into the cylinder 8 of the engine 1 and engine performance. Here, also, engine characteristics, that is, engine smoke in FIG. 5(a), HC in FIG. 5(b) and the stability of combustion in FIG. 5(c) are the same as in FIGS. 4(a) to 4(c), and it is noted that the fuel pressure, as well as the speed of swirl, influences combustion, and it can be understood that the fuel pressure has an optimum value.

Figure 6:
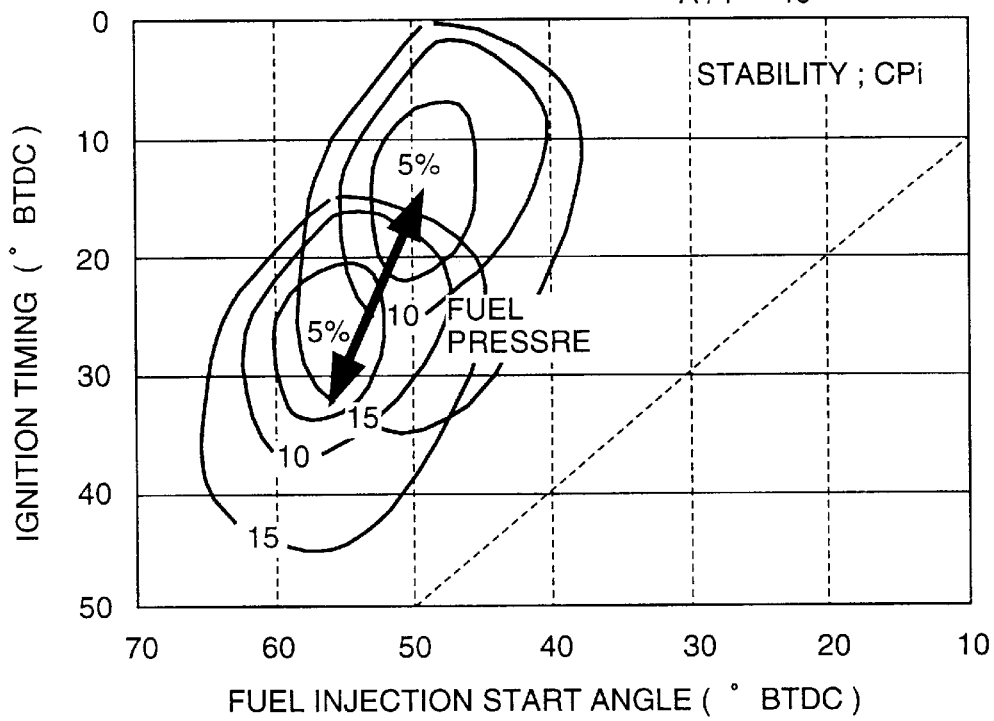
FIG. 6 is a diagram showing characteristics of the stability of combustion in the direct injection engine in FIG. 2 in which the pressure of fuel is taken into consideration.
Figure 7:
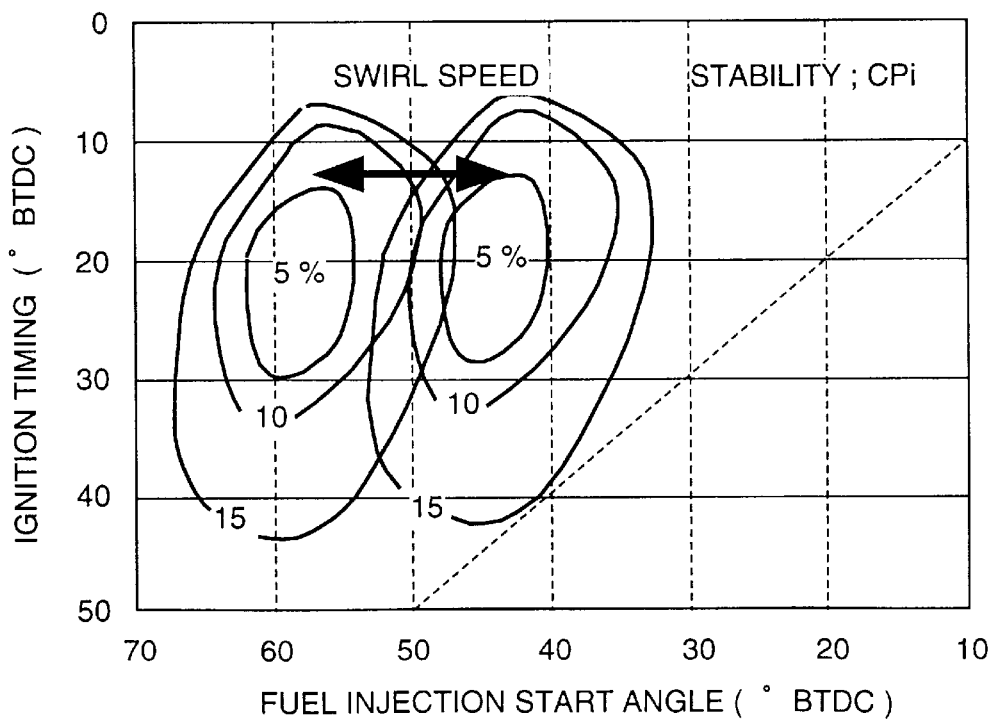
FIG. 7 is a diagram showing characteristics of the stability of combustion in the direct injection engine in FIG. 2 in which the speed of swirl is taken into consideration.

FIGS. 6 and 7 each show quantitatively influence of the fuel pressure and the speed of swirl explained in FIGS. 4(a) to 4(c) and 5(a) to 5(c) on the stratified combustion. Explaining about the fuel pressure in FIG. 6, an optimum point of combustion (a portion indicated by a contour of low percentage %) exists in a relation of fuel injection timing and ignition timing, however, the above-mentioned optimum point moves as the fuel pressure changes. As for the influence of the speed of swirl on the stratified combustion in FIG. 7 also can be explained of the same as in the fuel pressure. In real control, data as shown in FIGS. 4(a) to 4(c) and FIGS. 5(a) to 5(c) are obtained because fuel injection timing and ignition timing are given at predetermined values, respectively, under operational conditions in the same engine. In FIG. 6, a change in performance as shown by an arrow is one example.

Figure 8:
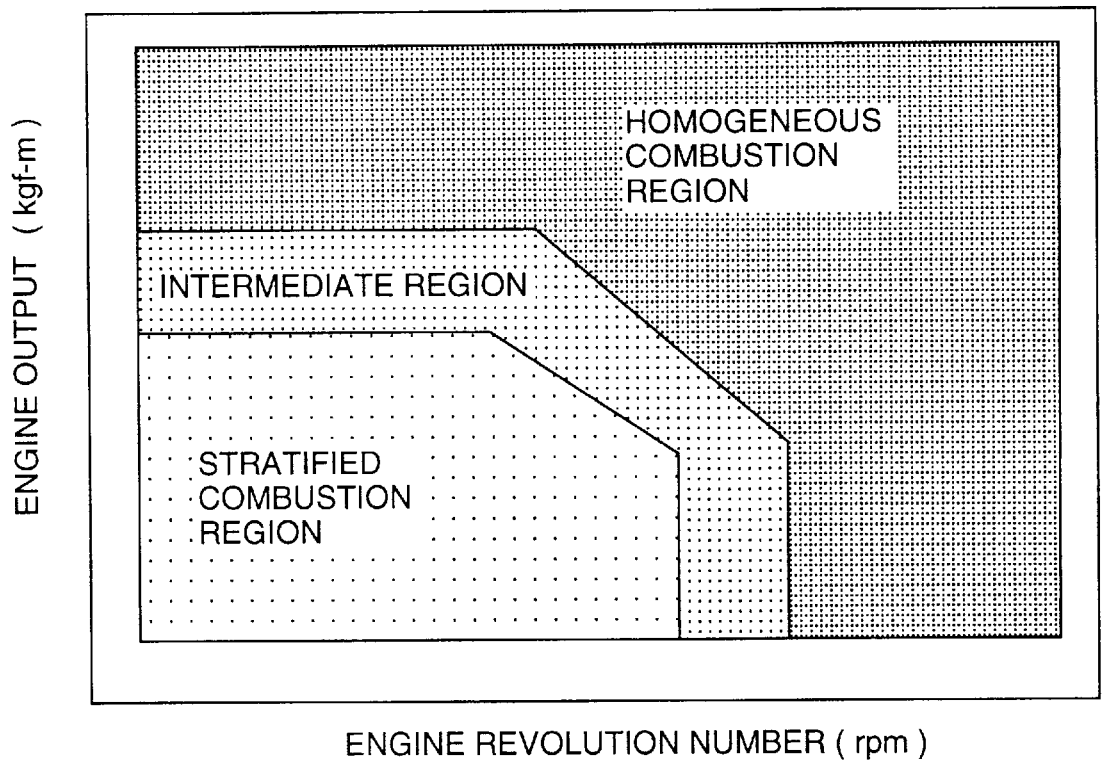
FIG. 8 is a diagram showing relationships between operational conditions (engine revolution number and engine output) and combustion state regions (stratified combustion, homogeneous combustion, etc.), of the direct injection engine in FIG. 1.
Figure 9:
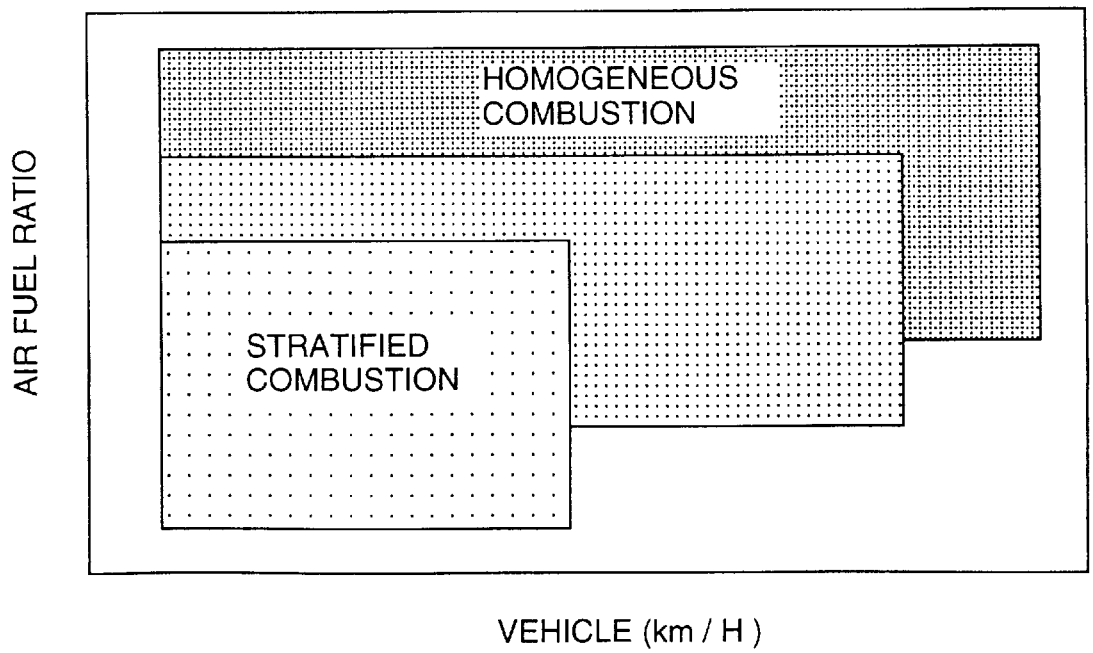
FIG. 9 is a diagram showing relationships between running conditions (vehicle speed and air fuel ratio) of a vehicle mounting thereon the direct injection engine of FIG. 1 and combustion state regions (stratified combustion, homogeneous combustion, etc.) of the engine.

FIGS. 8 and 9 show relations between regions of combustion state in an engine (stratified combustion, homogeneous combustion) and engine operational conditions (engine revolution number and engine output), and between regions of combustion state and vehicle running conditions (vehicle speed and air fuel ratio), respectively. In the case of a direct injection engine system, basically, fuel consumption is served by stratified combustion (a combustion method in which fuel is injected during a compression stroke of engine and, instantly, is ignited to burn), however, when the engine requires a high torque, homogeneous combustion is adapted which is effected by injecting fuel during an intake stroke of engine, in the same manner as in usual port injection.

An intermediate region (weakly stratified region or homogenous lean region) exists between the stratified combustion and homogenous combustion. FIG. 8 shows combustion regions defined based on a relation between the number of revolutions of engine and output required for the engine for the above-mentioned reason. FIG. 9 shows the combustion regions based on relations between vehicle speed and air fuel ratio. When at a usual vehicle speed (100 km/h or less), basically, stratified combustion is taken, however, the combustion reaches to homogeneous combustion when the vehicle is under condition such as running on the up grade.

Figure 10:
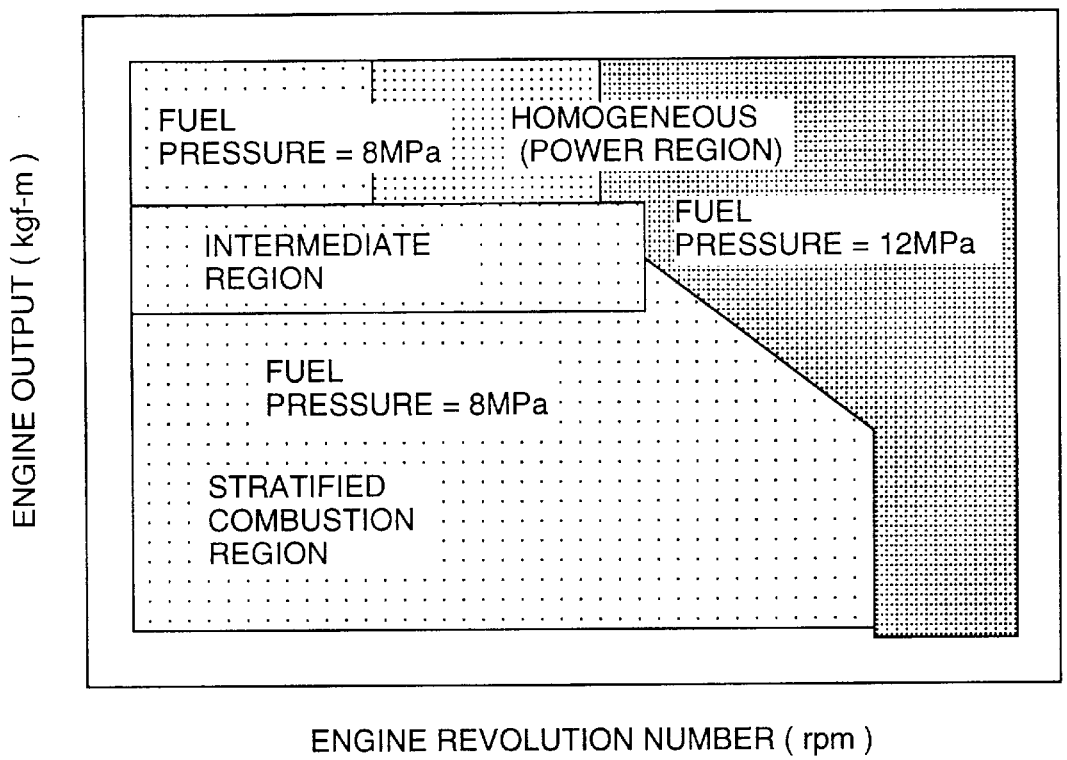
FIG. 10 is a diagram showing relationships between operational conditions (engine revolution number and engine output), and combustion state regions (stratified combustion, homogeneous combustion, etc.) and the pressure of fuel in the direct injection engine in FIG. 1.
Figure 11:
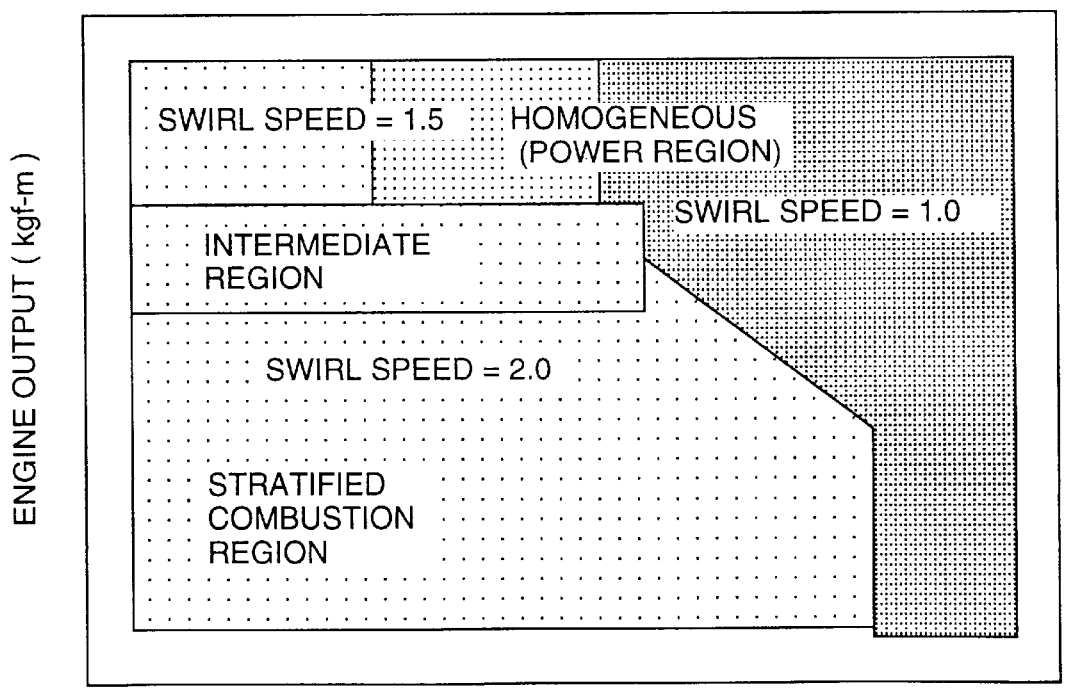
FIG. 11 is a diagram showing relationships between operational conditions (engine revolution number and engine output), and combustion state regions (stratified combustion, homogeneous combustion, etc.) and the speed of swirl in the direct injection engine in FIG. 1.

Next, FIG. 10 shows an example of a map of the pressure of fuel to the number of revolutions and output of the engine, and the pressure of fuel is determined depending on combustion conditions and a combustion state to aim at. FIG. 11 shows the speed of swirl necessary for obtaining an objective combustion state, and the speed of swirl is determined by a quantity of air taken in the engine 1 and an opening of the swirl control valve 31.

Figure 12:
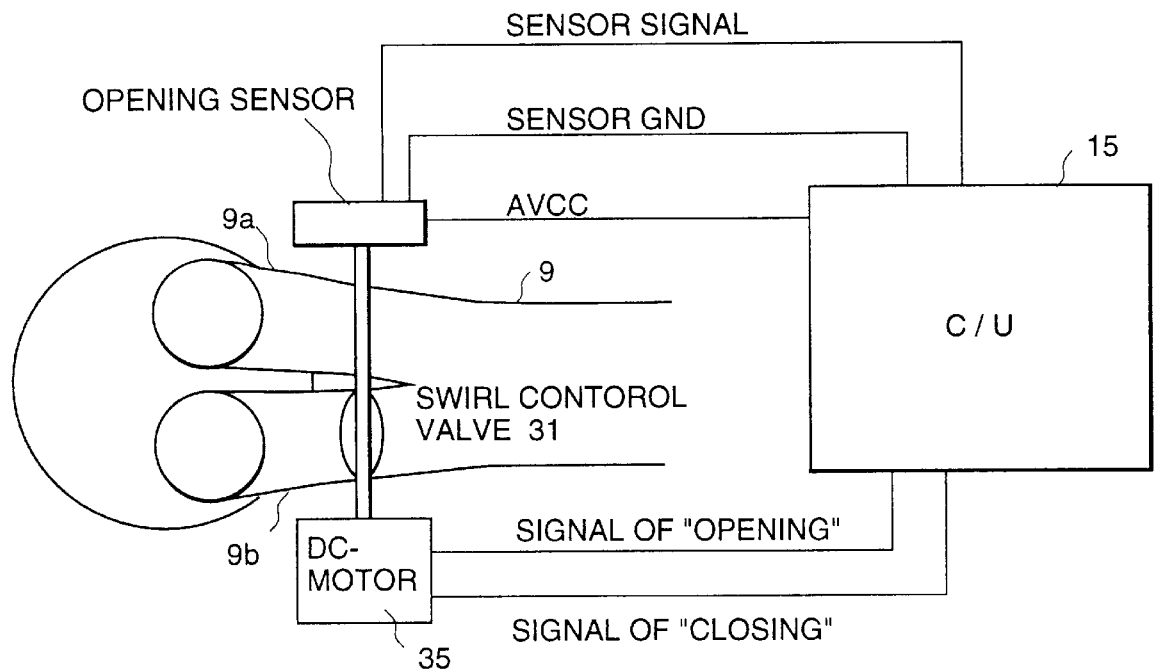
FIG. 12 is a schematic diagram of a construction of an intake pipe port portion and a swirl control valve of the direct injection engine in FIG. 1.
Figure 13:
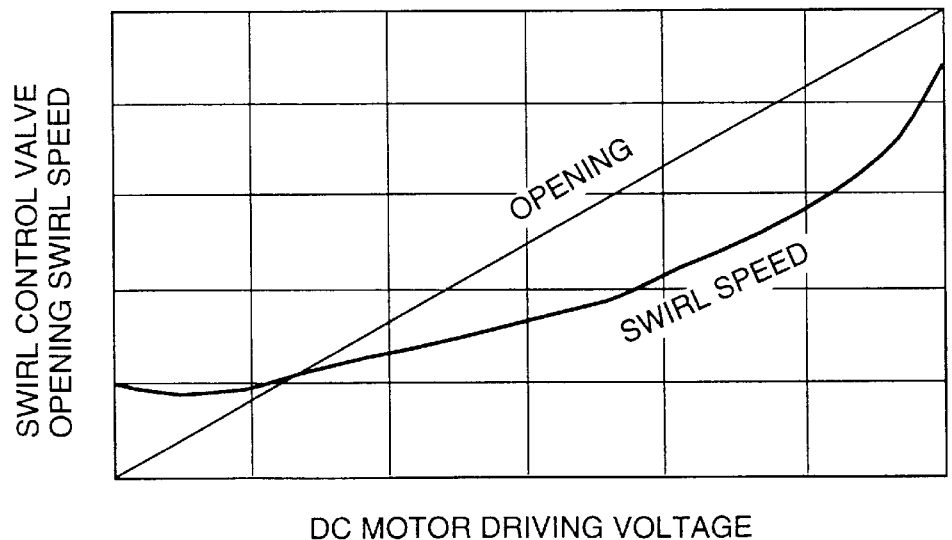
FIG. 13 is a diagram showing relationships between drive motor voltage for the swirl control valve in FIG. 12, and a valve opening and the number of swirls.

FIG. 12 shows a construction of the intake pipe portion 9 and the swirl control valve 31. In FIG. 12, the above-mentioned swirl control valve 31 is provided for one of two intake ports 9a, 9b of each cylinder 8 of the engine 1 so as to choke a passage of the intake port 9b, and an electric motor 35 is provided for opening or closing the swirl control valve 31. That is, the above-mentioned swirl control valve 31 is set to a target opening by an instruction from the control unit (C/U) 15. FIG. 13 shows the performance of the swirl control valve 31. The opening of the swirl control valve 31 is set by the DC motor 35 so that an intake air becomes an air swirl of a target speed. When an flow rate of air for the engine can be specified, the speed of swirl can be controlled from a characteristic curve as shown in FIG. 13.

Figure 14:
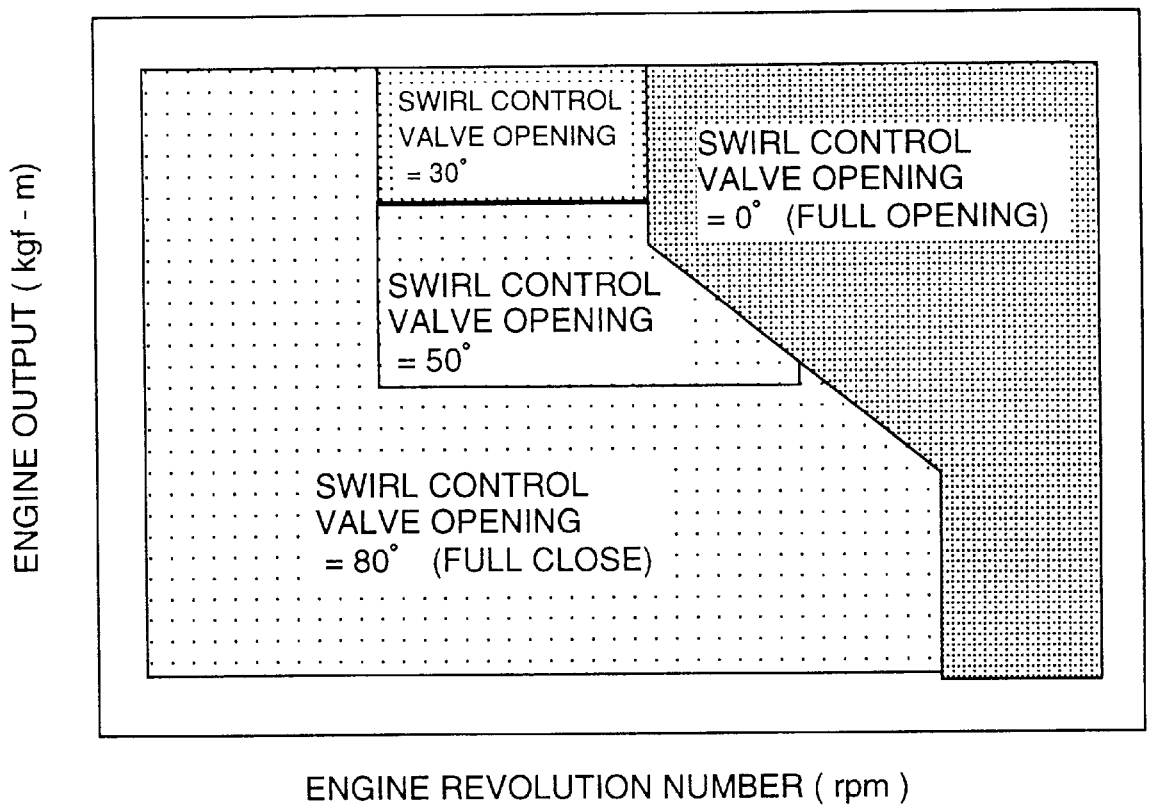
FIG. 14 is a diagram showing a relationship between operational conditions (engine revolution number and engine output) of the direct injection engine in FIG. 1 and an opening of a swirl control valve.

FIG. 14 shows a map of openings of the swirl control valve 31 applied for real engines. An opening of the swirl control valve 31, usually, becomes smaller as the engine runs higher in speed and higher in torque. The reason is that the speed of swirl naturally increase because the flow rate of air to the engine increases and that it is so made that the resistance of intake air is imparted to the engine 1 as less as possible. As described later, running of the engine is controlled, taking, as a base opening, openings of the swirl control valve 31 shown in FIG. 14.

Figure 15:
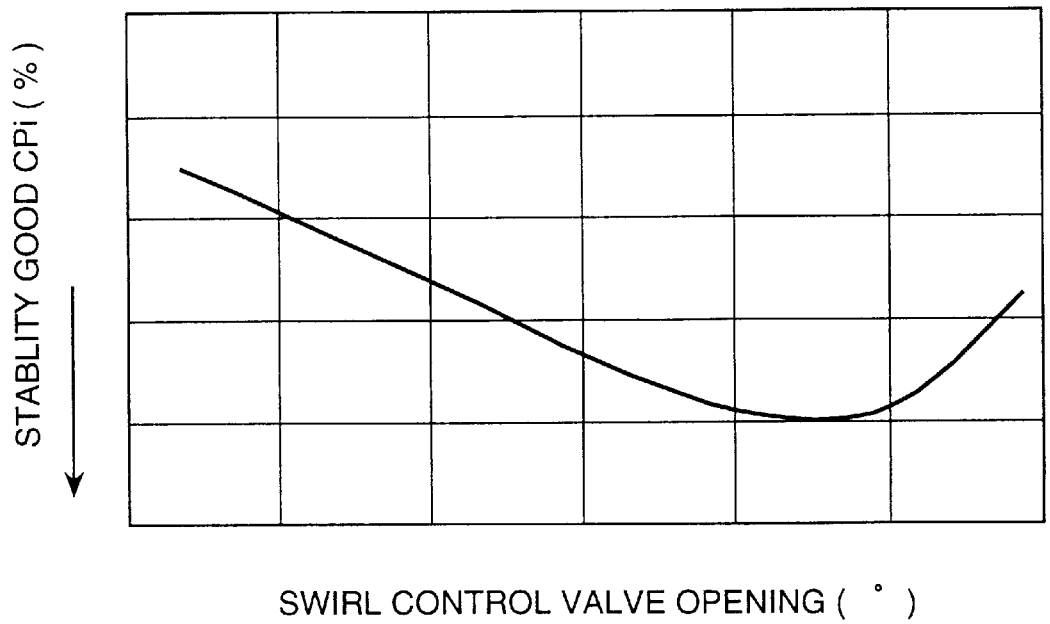
FIG. 15 is a diagram showing a relationship between an opening of the swirl control valve in FIG. 12 and the stability of combustion in the engine.
Figure 16:
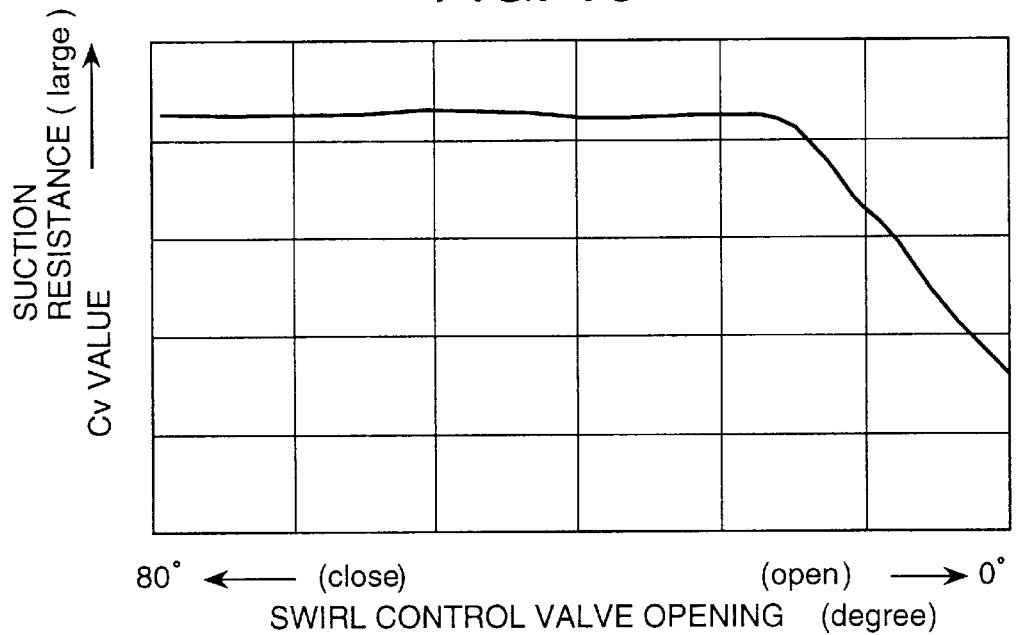
FIG. 16 is a diagram showing a relationship between an opening of the swirl control valve in FIG. 12 and Cv values of the engine.
Figure 17:
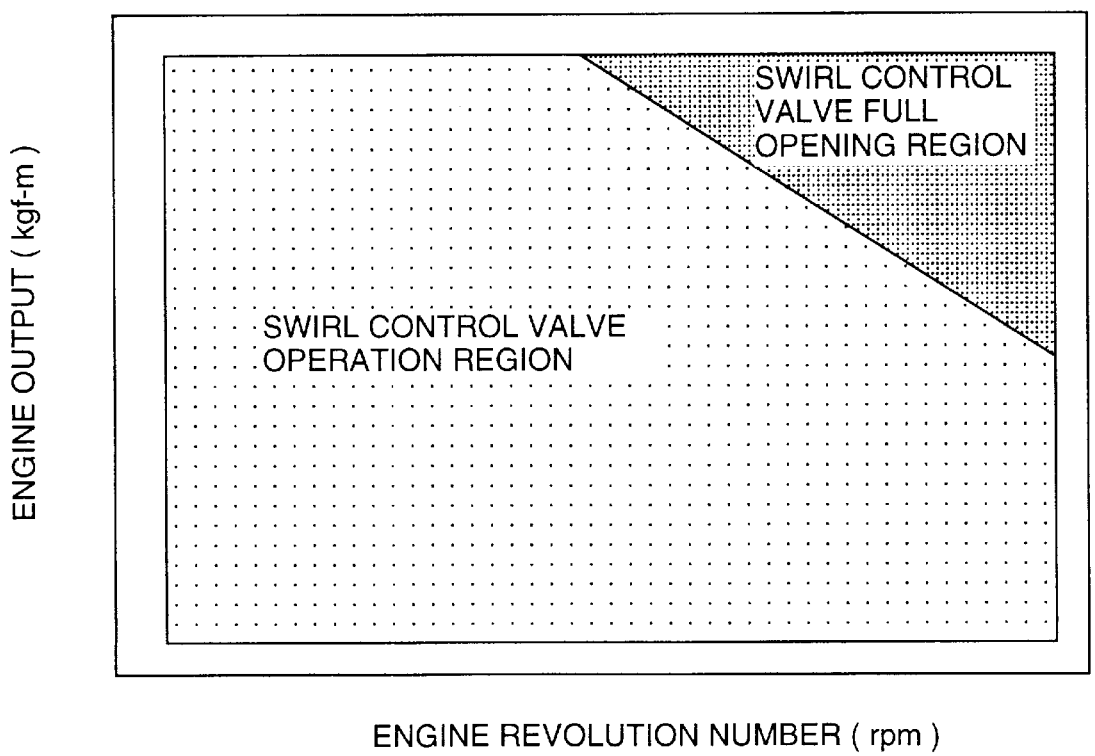
FIG. 17 is a diagram showing operational conditions (engine revolution number and engine output) of the direct injection engine in FIG. 1 and an operational region of a swirl control valve.

Next, FIG. 15 shows the stability of combustion in engine, in a relation with openings of the swirl control valve 31, and the combustion stability has a minimum value at a specific opening of the swirl control valve 31 under the same operational conditions. In the other words, it is noted that it is sufficient if an opening of the swirl control valve 31 is controlled so as to minimize "CPi" the stability of the engine. Further, it was explained that the swirl control valve 31 caused a resistance to air suction in the engine, and FIG. 16 is a diagram for explaining it. In FIG. 1, under operational conditions (a high revolution number, a high load of the engine) in the same engine, the larger the opening of swirl control valve 31 (the smaller an air flow passage area), the smaller a Cv value indicative of an inverse of a suction resistance in the engine 1 becomes. Therefore, it is necessary to set a full opening region of the swirl control valve 31 as shown in FIG. 17.

Next, referring to FIGS. 18–22, concrete control flows of the engine controller for operating the swirl control valve 31 of the present embodiment are explained.

Figure 18:
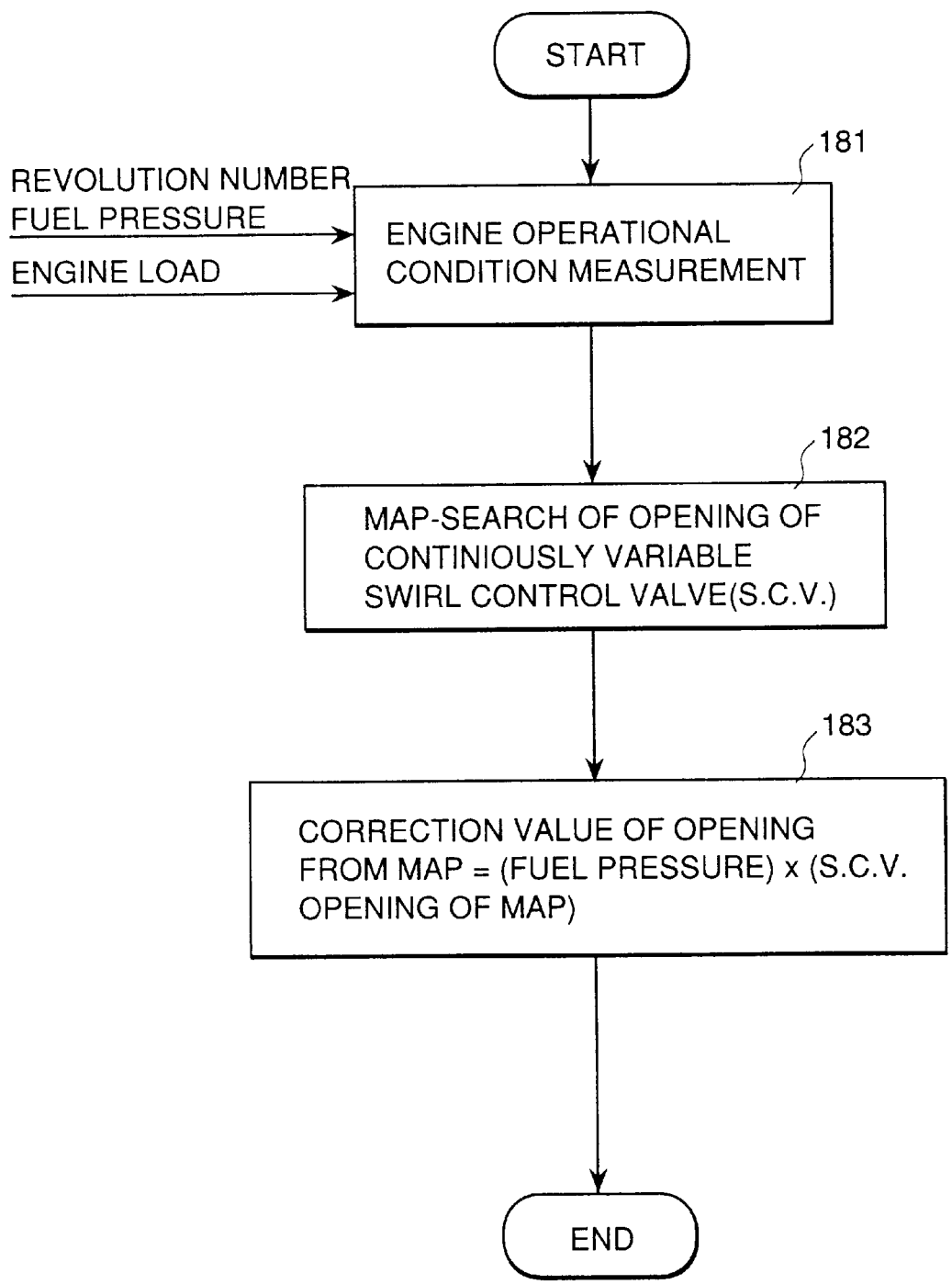
FIG. 18 is a flowchart showing a control flow (I) of the direct injection engine (swirl control valve) in FIG. 1.

FIG. 18 is a flow chart for correction of fuel pressure since the stability of engine is influenced by the fuel pressure in injection of fuel supplied to the engine as described before. In FIG. 18, the number of revolutions, the pressure of fuel, engine loads are input to measure operational conditions of the engine at a step 181, and the flow advances to a step 182. At the step 182, basic openings of the swirl control valve 31 are searched on a map. At a step 183, the above-mentioned opening of the swirl control valve 31 is corrected on the basis of a function of a pressure value of fuel supplied to the engine 1. Values really measured are used as the fuel pressure values here. Thereby, "openings of swirl control valve" obtained from the map based on "fuel pressure" determined by the operational conditions are corrected as above, and an error occurred during a real operation of the engine can be absorbed, so that this control can set a wider region of the combustion stability than in the case where it is set simply depending only on the map.

Figure 19:
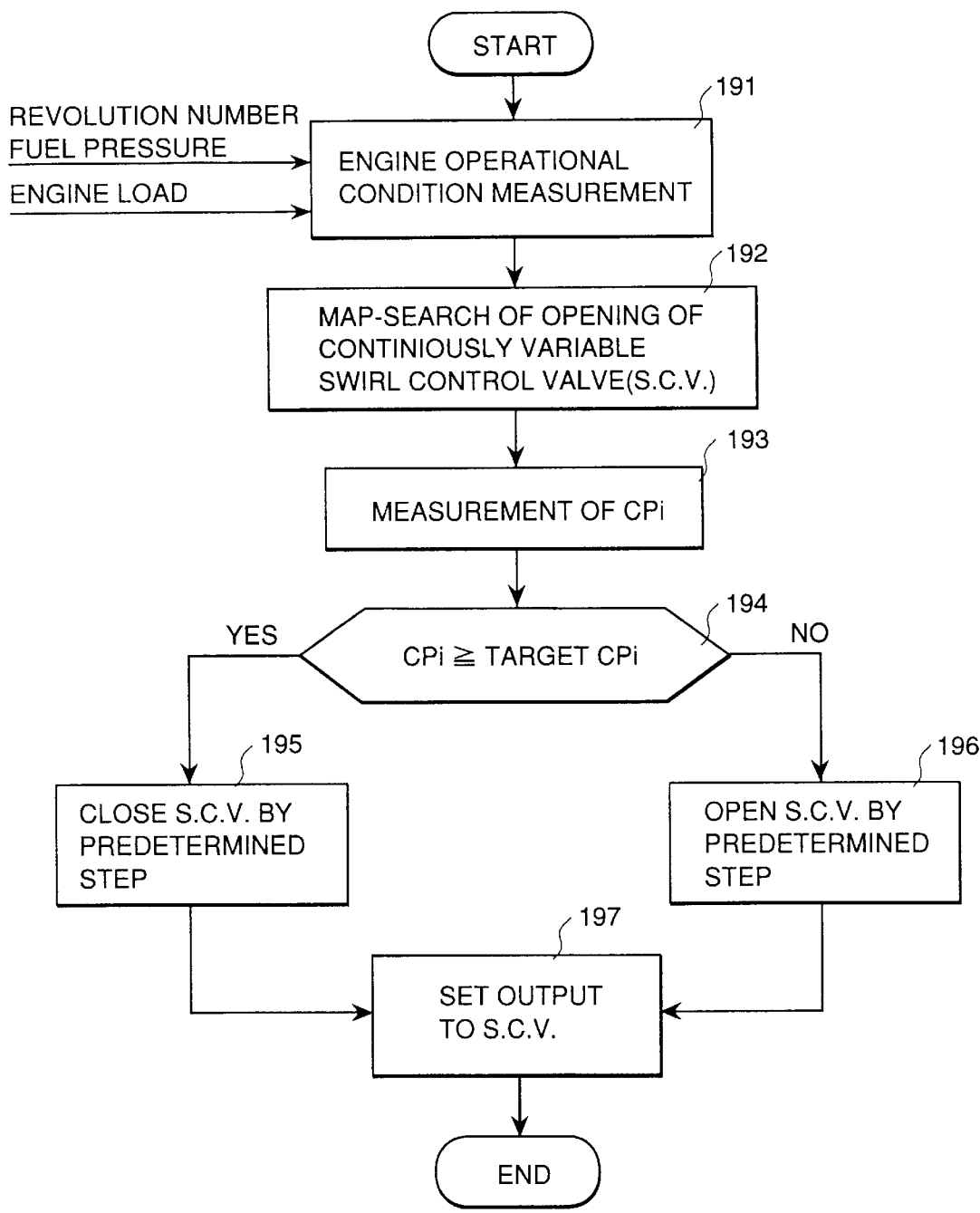
FIG. 19 is a flowchart showing a control flow (II) of the direct injection engine (swirl control valve) in FIG. 1.

FIG. 19 shows a flow of actively controlling openings of the swirl control valve 31 in order to further improve the combustion stability of engine. Steps 191 and 192 are the same as the steps 181 and 182 in FIG. 18, that is, a basic opening of the swirl control valve is searched from a map, depending on the operational conditions, to set an opening of the swirl control valve 31. Next, at a step 193, the combustion stability CPi of the engine 1 based on the result of the above-mentioned opening setting is measured, and the flow advances to a step 194. At the step 194, the above-mentioned measured combustion stability CPi is compared with a target value, and when it is larger than the target value, that is, when the stability is bad, the flow advances to a step 195. At the step 195, the opening of the swirl control valve 31 is controlled toward closing side to improve the combustion stability of the engine 1. Further, at the step 194, when the combustion stability CPi is smaller than the target value, the flow advances to a step 196, and the opening of the swirl control valve 31 is operated toward opening side by a predetermined opening, taking into consideration a possibility of reducing a Cv value explained in FIG. 16. In the case where the combustion stability CPi is smaller than the target value, as another method at the step 196 there is also one method of keeping the opening of the swirl control valve 31 as it is. At a step 197, an output to the swirl control valve 31 is set on the basis of a signal of opening or a signal of closing of the swirl control valve 31 at the step 195 or step 196.

Figure 20:
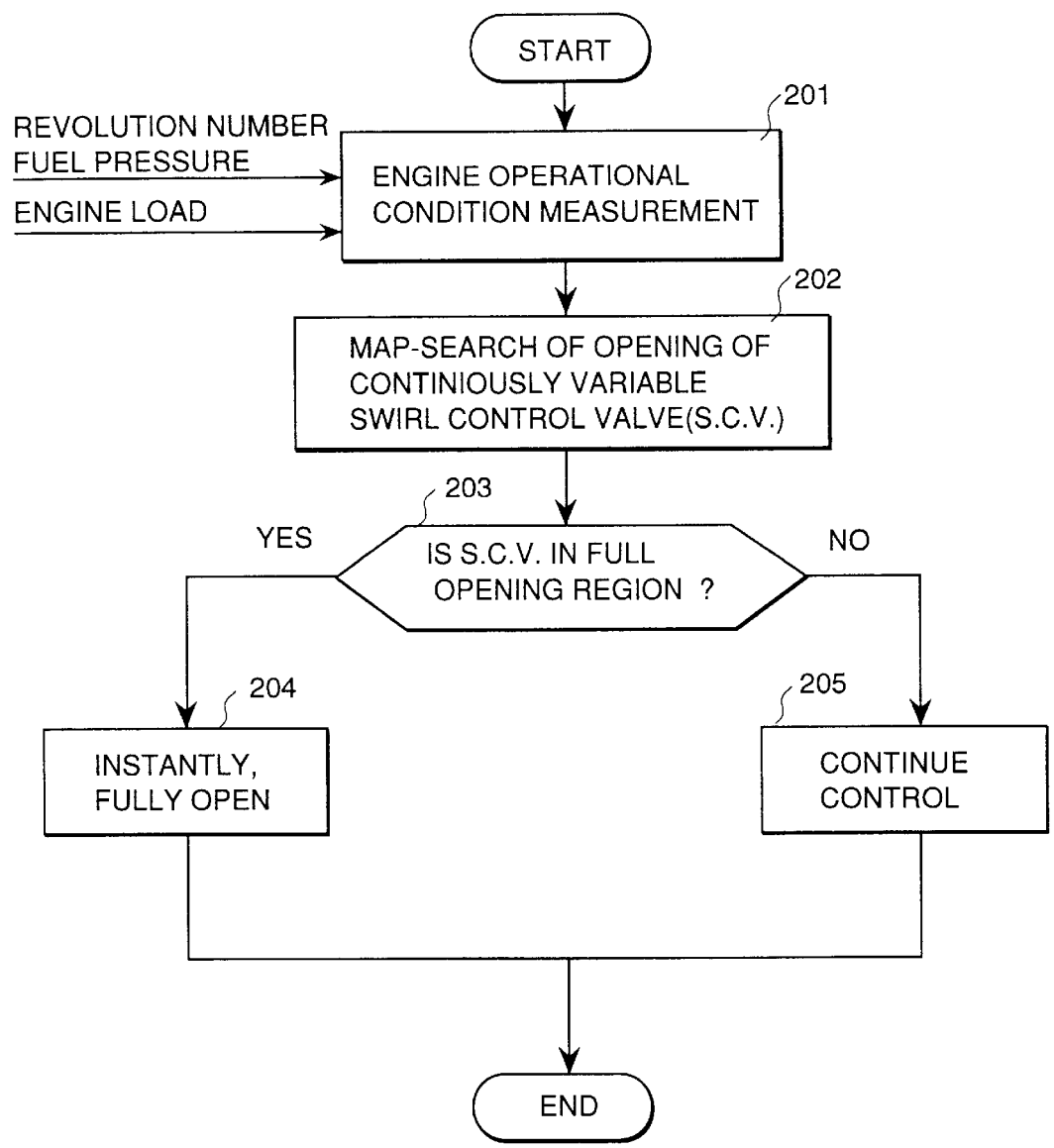
FIG. 20 is a flowchart showing a control flow (III) of the direct injection engine (swirl control valve) in FIG. 1.

FIG. 20 is a control flow for controlling so that the Cv value does not becomes smaller. In FIG. 20, steps 201 and 202 are the same as the steps 191 and 192 in FIG. 19, and a basic opening of the swirl control valve is searched from the map depending on engine operational conditions and an opening of the swirl control valve is set. At a step 203, conditions for full opening of the swirl control valve 31 are judged, when the condiotions required for full opening are established, the flow advances to a step 204. At the step 204, the swirl control valve 31 is fully opened instantly. The conditions required to fully open the swirl control valve 31 at the step 203 includes all factors to increase the Cv value, and should not be limited only to the conditions shown in FIG. 17. At the step 203, in the case where the conditions to required for fully opening are judged not to be established, the flow advances to a step 205, and at the step 205, usual control is continued.

Figure 21:
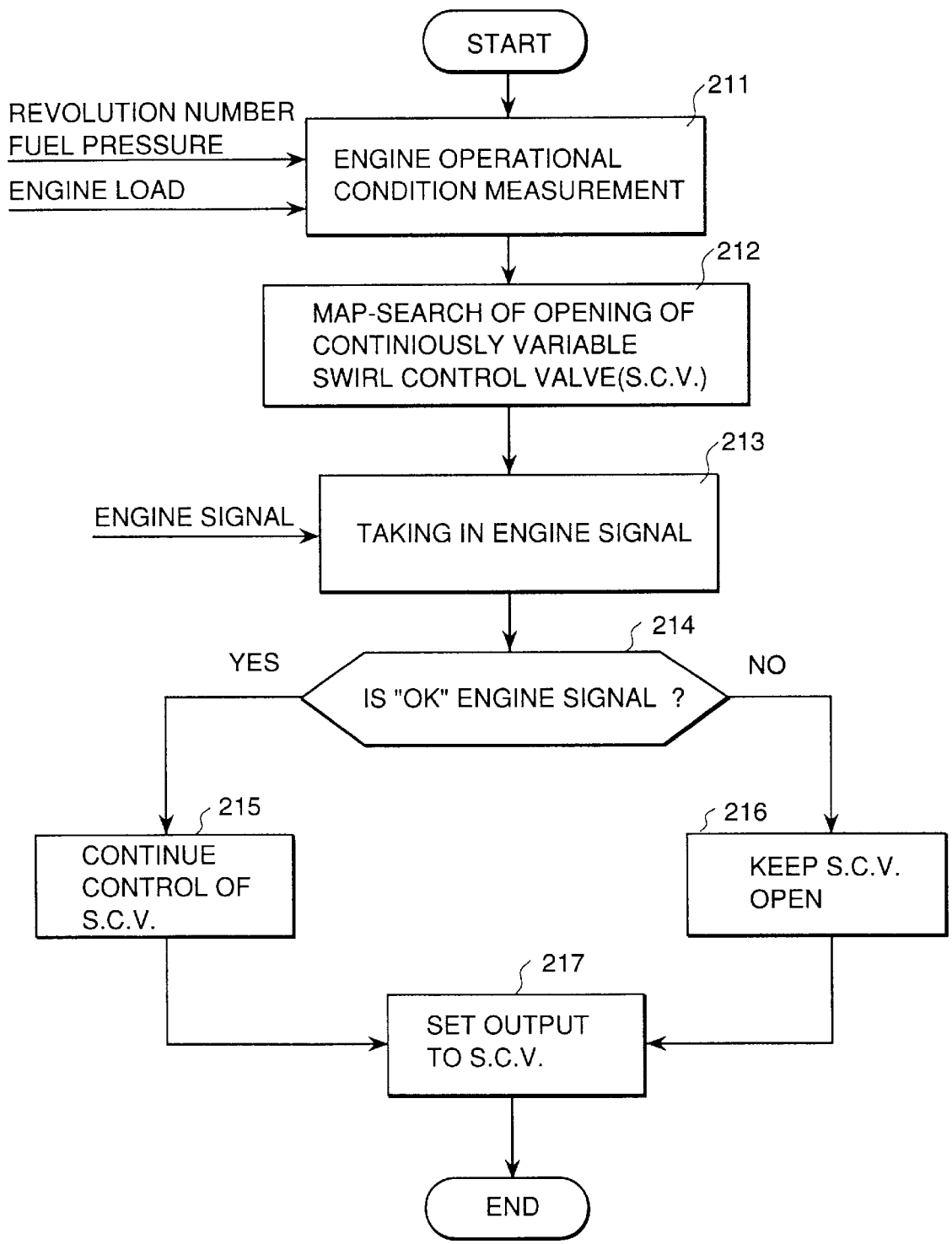
FIG. 21 is a flowchart showing a control flow (IV) of the direct injection engine (swirl control valve) in FIG. 1.

FIG. 21 is a flowchart for explaining control about an example of the above-mentioned conditions under which the Cv value does not becomes smaller. Steps 211 and 212 are the same as the steps 201 and 202 in FIG. 20, and a basic opening of the swirl control valve is searched from the map depending on engine operational conditions and an opening of the swirl control valve is set. At a step 213, engine signals are taken in. The engine signals are ones from a diagnosis apparatus diagnosing whether the engine operational condtions, all actuators and sensors concerning the engine are normal or abnormal. At a step 214, whether the engine is normal or abnormal is judged on the basis of the above-mentioned engine signals. At the step 214, in a case where it is judged that any abnormality occurs in the control system, the flow advances to a step 216, and an opening of the swirl control valve, as well as other control parts, is fixed to be open thereby to prevent occurrence of secondary failure. In a case where it is judged that there is no abnormality, the flow advances to a step 215, at which usual control is continued. At step 217, an output to the swirl control valve 31 is set on the basis of a signal of opening or a signal of closing, of the swirl control valve 31 at the step 215 or step 216.

FIG. 22 shows a control flow in a case where improvement of the stability of combustion in an engine as explained in FIG. 19 is positively applied on a V type engine having left and right banks.

Here, a swirl control valve 31 is mounted on each of the left and right banks. At a step 221, the number of revolutions, fuel pressure, engine load are input to measure engine conditions, and the flow advances to a step 222. At the step 222, conditions of fuel and ignition are set according to the engine operational conditions, and the flow advances to a step 223. Usually, the same data are set on each of the left and right banks, however, it is better to set different optimum data on respective banks. At the step 223, an opening of the swirl control valve 31 is set. The opening of the swirl control valve 31 is corrected at a later step, so that here the same value is set.

Next, at a step 224, combustion variation in the left and right banks of the engine is judged, in a case where the variation is larger than a reference, the flow advances to a step 225. At the step 225, it is judged which bank is bad (in which bank the combustion variation is larger), in a case where the combustion variation in the right bank is larger, the flow advance to a step 227, an opening of the swirl control valve 31 in the right bank is set so as to close by a predetermined opening, and then advances to a step 229. At the above step 225, in a case where the combustion variation in the left bank is larger, the flow advance to a step 228, an opening of the swirl control valve 31 in the left bank is set so as to close by a predetermined opening to converge the variation to be within a certain range, and then the flow advances to a step 229.

Further, at the step 224, combustion variations in the left and right banks of the engine are judged, and when the variation is smaller than the reference, the flow advances to the step 226. At the step 226, usual control is continued. At the step 229, an output to the swirl control valve 31 is set, based on a signal of opening or a signal of closing, of the swirl control valve 31 at the step 226, step 227 or step 228.

As mentioned above, an embodiment of the present invention is described in detail, the present invention is not limited to the embodiment, it can be variously modified in design as long as it is not separated from a spirit of the present invention set forth in the claims.

As is apparent from the above description, the controller of the direct injection engine of the present invention can effect control of an opening of the swirl control valve, which is aimed by the direct injection engine, without hindering control of the whole engine. Further, a more proper and precise swirl suited for optimum combustion of the engine can be produced by controlling to correct an opening of the swirl control valve, taking into consideration a combustion state and fuel pressure of the engine.

What is claimed is:

1. A controller of a direct injection engine provided with a swirl control valve arranged in an air intake port portion, wherein said swirl control valve is constructed so that an opening of said swirl control valve is controllable on the basis of at least one factor representative of combustion state is a combustion stability being in a target region.

2. A controller of a direct injection engine according to claim 1, wherein a basic opening position of said swirl control valve is controlled on the basis of the number of revolutions and a target torque of said operational conditions.

3. A controller of a direct injection engine according to claim 1, wherein
 a valve opening position of said swirl control valve is controlled to correct so as to open not to reduce engine power when at least one of actuators or a control system of said engine is abnormal.

4. A controller of a direct injection engine according to claim 3, wherein when a valve opening position of said swirl control valve is controlled to correct so as to open not to reduce engine power when at least one of actuators or a control system of said engine is abnormal, the valve opening position is restricted so that an increment rate of engine output per time does not become more than a predetermined value.

5. A controller of a direct injection engine according to claim 1, wherein said at least one of factors indicative of combustion state is combustion stability, and wherein the factor indicative of said combustion stability is detected and said swirl control valve is controlled on the basis of the detected combustion stability.

6. A controller of a direct injection engine according to claim 1, wherein an opening position of said swirl control valve is controlled to a valve opening position set for each combustion state on the basis of an air fuel ratio set as a target of said engine.

7. A controller of a direct injection engine according to claim 1, wherein a valve opening position of said swirl control valve is controlled to correct so as to be stable in engine combustion by a factor indicative of the stability of combustion in said engine.

8. A controller of a direct injection engine provided with a swirl control valve arranged in an air intake port portion, a fuel injection valve and a variable fuel pressure regulator, said controller further comprising:
 means for controlling the pressure of fuel by said variable fuel pressure regulator;
 means for detecting operational conditions;
 means for detecting a combustion state; and
 means for controlling an opening of said swirl control valve on the basis of the operational condition and the combustion state.

9. A controller of a direct injection engine according to claim 8, wherein a fuel pressure of said variable fuel pressure regulator is controlled based on a factor indicative of the stability of combustion.

10. A controller of a direct injection engine according to claim 8, wherein a basic opening position of said swirl control valve is controlled on the basis of the number of revolutions and a target torque of said operational conditions.

11. A controller of a direct injection engine according to claim 8, wherein an opening position of said swirl control valve is controlled to a valve opening position set for each combustion state on the basis of an air fuel ratio set as a target of said engine.

12. A controller of a direct injection engine according to claim 8, wherein a valve opening position of said swirl control valve is controlled to correct so as to be stable in engine combustion by a factor indicative of the stability of combustion in said engine.

13. A controller of a direct injection engine according to claim 12, wherein a basic opening position of said swirl control valve is controlled on the basis of the number of revolutions and a target torque of said operational conditions.

14. A controller of a direct injection engine according to claim 8, wherein a valve opening position of said swirl control valve is controlled to correct on the basis of operational fuel pressure of a fuel injection valve.

15. A controller of a direct injection engine according to claim 6, wherein a valve opening position of said swirl control valve is controlled to correct on the basis of operational fuel pressure of a fuel injection valve.

16. A controller of a direct injection engine provided with a swirl control valve arranged in an air intake port portion, wherein said swirl control valve is constructed so that an opening of said swirl control valve is controllable on the basis of an operational condition of said direct infection engine and a combustion state, wherein a valve opening position of said swirl control valve is controlled to correct on the basis of operational fuel pressure of a fuel injection valve.

17. A controller of a direct injection engine, provided with a swirl control valve arranged in an air intake port portion, wherein said swirl control valve is constructed so that an opening of said swirl control valve is controllable on the basis of an operational condition of said direct injection engine and a combustion state, wherein a basic opening position of said swirl control valve is controlled on the basis of the number of revolutions and a target torque of said operational conditions, and a valve opening position of said swirl control valve is controlled to correct on the basis of operational fuel pressure of a fuel injection valve.

18. A controller of a direct injection engine provided with a swirl control valve arranged in an air intake port portion, wherein said swirl control valve is constructed so that an opening of said swirl control valve is controllable on the basis of an operational condition of said direct injection engine and a combustion state, wherein a valve opening position of said swirl control valve is controlled to correct so as to be stable in engine combustion by a factor indicative of the stability of combustion in said engine and a valve opening position of said swirl control valve is controlled to correct on the basis of operational fuel pressure of a fuel injection valve.

19. A controller of a direct injection engine provided with a swirl control valve arranged in an air intake port portion, wherein means is provided for detecting a factor indicative of combustion state and for controlling said swirl control valve on the basis of the detected result of said factor indicative of combustion state.

20. A controller of a direct injection engine according to claim 19, wherein said factor indicative of combustion sate is combustion stability, and wherein aid means detects said combustion stability and controls said swirl control valve on the basis of the detected combustion stability.

* * * * *